United States Patent [19]
Kobayashi

[11] Patent Number: 5,539,432
[45] Date of Patent: Jul. 23, 1996

[54] METHOD OF AND APPARATUS OF CONVERTING A SET OF ATTRIBUTES OF DISPLAY DATA INTO CODE

[75] Inventor: Hironobu Kobayashi, Tokyo, Japan

[73] Assignee: Kabushiki Kaisha Toshiba, Kawasaki, Japan

[21] Appl. No.: 358,756

[22] Filed: Dec. 19, 1994

Related U.S. Application Data

[63] Continuation of Ser. No. 64,785, May 21, 1993, abandoned, which is a continuation of Ser. No. 794,625, Nov. 18, 1991, abandoned, which is a continuation of Ser. No. 330,428, Mar. 30, 1989, abandoned.

[30] Foreign Application Priority Data

Mar. 30, 1988 [JP] Japan ...................... 63-74532

[51] Int. Cl.$^6$ .................................................. G09G 5/06
[52] U.S. Cl. ................................... 345/199; 345/147
[58] Field of Search .................. 340/703, 709, 340/716, 719, 793, 814, 767, 701; 358/27; 345/150, 151, 147, 149, 112, 186, 199

[56] References Cited

U.S. PATENT DOCUMENTS

| | | | |
|---|---|---|---|
| 4,509,043 | 4/1985 | Mossaides | 340/793 |
| 4,694,286 | 9/1987 | Bergstedt | 340/703 |
| 4,709,230 | 11/1987 | Popowski | 340/701 |
| 4,721,631 | 1/1988 | Endo et al. | 313/506 |
| 4,760,387 | 7/1988 | Ishii et al. | 340/717 |
| 4,774,435 | 9/1988 | Levison | 313/509 |
| 4,789,855 | 12/1988 | Ozeki | 340/703 |
| 4,827,255 | 5/1989 | Ishii | 340/703 |
| 5,164,799 | 11/1992 | Uno | 313/506 |
| 5,194,777 | 3/1993 | Nakaya | 313/509 |
| 5,235,246 | 8/1993 | Konishi | 313/506 |

FOREIGN PATENT DOCUMENTS

| | | |
|---|---|---|
| 0122082A | 10/1984 | European Pat. Off. . |
| 0213823A2 | 3/1987 | European Pat. Off. . |
| 3240473 | 5/1984 | Germany . |
| 0122082 | 10/1984 | Germany . |
| 2059729 | 4/1981 | United Kingdom . |
| 2116009 | 9/1983 | United Kingdom . |
| 2167926 | 6/1986 | United Kingdom . |

OTHER PUBLICATIONS

Foley et al; "Fundamental of Interactive Computer Graphic"; Addison–Wesley Pubblishing Company; 1982; 488–491.

Primary Examiner—Richard Hjerpe
Assistant Examiner—Chanh Nguyen
Attorney, Agent, or Firm—Cushman Darby & Cushman

[57] ABSTRACT

An apparatus for displaying display data in desired representations, includes a storage section for storing the display data, attributes being assigned to data portions of the display data, a display section for reading out the display data from the storage section, and displaying the display data with the colors determined in accordance with display codes assigned to the attributes in a execution mode, and a changing section for changing a first display code of the display codes to a second display code. The changing section may be varied so that it automatically searches for at least one other attribute to which the first code is assigned changing the first code assigned to the other attribute to the second code. The first display code is assigned to one of the attributes which is selected by an input attribute selection instruction, and the second display code is selected by an input code selection instruction in a code change mode.

10 Claims, 4 Drawing Sheets

| ENTRY | GRADA-TION CODE |
|---|---|
| 0 | 0 |
| 1 | 1 |
| 2 | 1 |
| 3 | 1 |
| | |
| | |
| 10 | 1 |
| 11 | 1 |
| 12 | 2 |
| 13 | 2 |
| 14 | 2 |
| 15 | 3 |

| ENTRY | GRADA-TION CODE |
|---|---|
| 0 | 0 |
| 1 | 1 |
| 2 | 1 |
| 3 | 1 |
| | |
| | |
| 10 | 1 |
| 11 | 1 |
| 12 | 3 |
| 13 | 2 |
| 14 | 2 |
| 15 | 3 |

| ENTRY | GRADA-TION CODE |
|---|---|
| 0 | 0 |
| 1 | 1 |
| 2 | 1 |
| 3 | 1 |
| | |
| | |
| 10 | 1 |
| 11 | 1 |
| 12 | 3 |
| 13 | 3 |
| 14 | 3 |
| 15 | 3 |

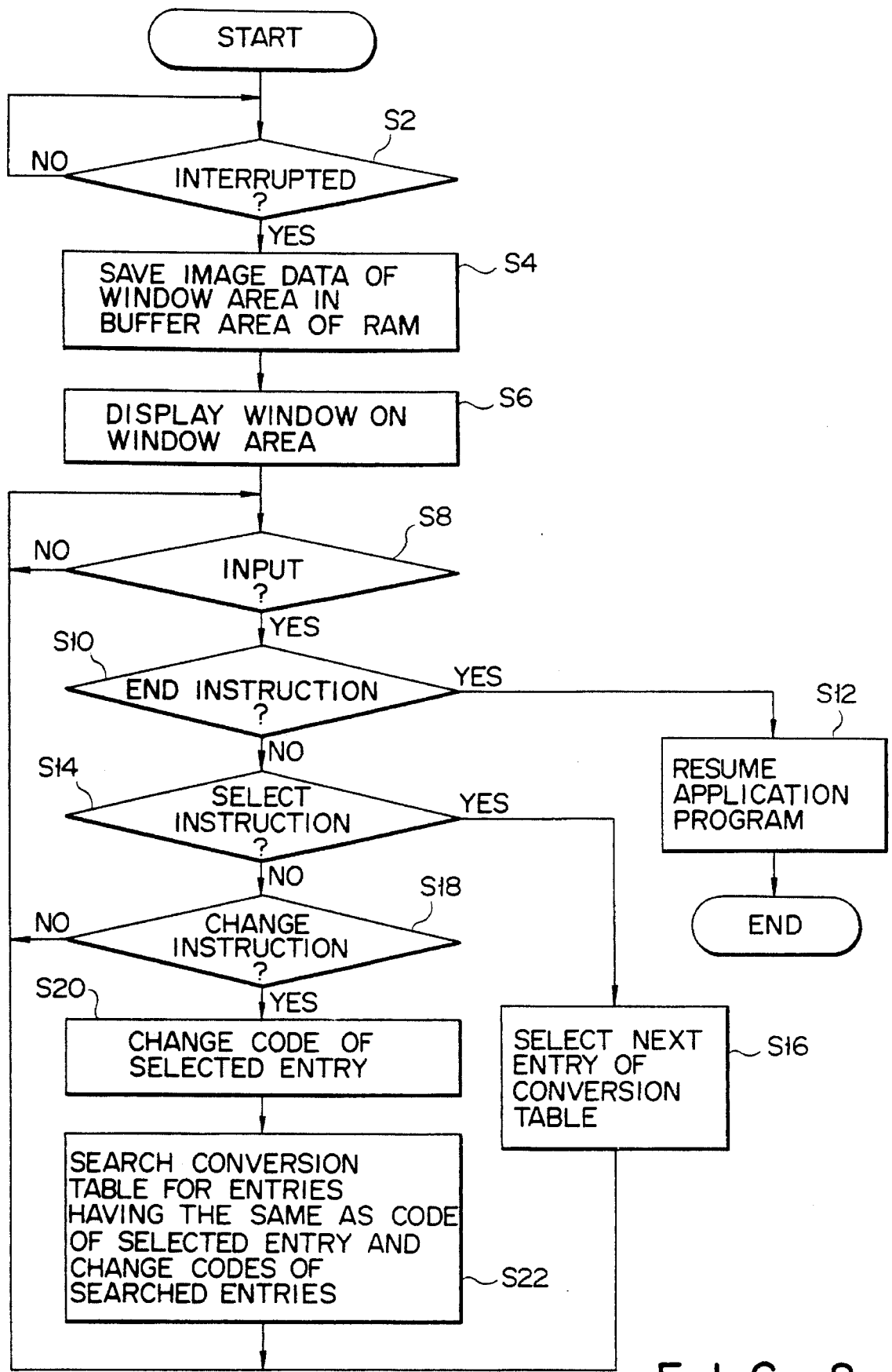
F I G. 2

| ENTRY | GRADATION CODE |
|---|---|
| 0 | 0 |
| 1 | 1 |
| 2 | 1 |
| 3 | 1 |
| ... | ... |
| 10 | 1 |
| 11 | 1 |
| 12 | 3 |
| 13 | 3 |
| 14 | 3 |
| 15 | 3 |
FIG. 5C
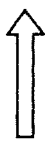
| ENTRY | GRADATION CODE |
|---|---|
| 0 | 0 |
| 1 | 1 |
| 2 | 1 |
| 3 | 1 |
| ... | ... |
| 10 | 1 |
| 11 | 1 |
| 12 | 3 |
| 13 | 2 |
| 14 | 2 |
| 15 | 3 |
FIG. 5B
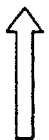
| ENTRY | GRADATION CODE |
|---|---|
| 0 | 0 |
| 1 | 1 |
| 2 | 1 |
| 3 | 1 |
| ... | ... |
| 10 | 1 |
| 11 | 1 |
| 12 | 2 |
| 13 | 2 |
| 14 | 2 |
| 15 | 3 |
FIG. 5A

METHOD OF AND APPARATUS OF CONVERTING A SET OF ATTRIBUTES OF DISPLAY DATA INTO CODE

This is a continuation of application Ser. No. 08/064,785, filed on May 21, 1993, which is abandoned upon the filing hereof and which is an FWC of Ser. No. 07/794,625, filed Nov. 18, 1991, which is an FWC of Ser. No. 07/330,428, filed Mar. 30, 1989, both cases now abandoned.

BACKGROUND OF THE INVENTION

1. Field of the Invention

The present invention relates to a method and an apparatus capable of converting a set of attributes of display data into a desired code and thereby displaying the data without correcting an application program.

2. Description of the Related Art

With recent development in computer techniques, advanced functions such as graphic display, multi-color display, and multi-window display are realized in an application program in order to establish a good man-machine interface. A plurality of color palettes are used in such display. Display data has an attribute for designating a color palette to be used and is displayed on a color display monitor in accordance with a color set in the color palette. That is, many of currently-available application programs are designed for a color CRT.

Recently, a lap-top computer which can be conveniently carried has been developed. In such a computer, a flat panel display such as an LCD (Liquid Crystal Display) or a PDP (Plasma Display Panel) is generally used as a display device. These display devices are of a mono-color type in which, for example, data can be displayed by only four colors, i.e., four gradation levels by a hardware limitation of four palettes. For this reason, if a commercially-available application program is directly planted in the lap-top computer without any modification, color competition occurs to disable discrimination of color boundaries.

SUMMARY OF THE INVENTION

The present invention has been made in consideration of the above situation and has as its object to provide an apparatus and a method capable of displaying display data having a first attribute in a desired representation, without changing an application program.

In order to achieve the above object, an apparatus according to the present invention includes a memory for storing display data, each portion of the display data having an attribute corresponding to a representation to be used, a changing unit for changing a first code of display code data corresponding to an attribute designated among the attributes to a second designated code and for changing another first code to the second code, and a display unit for displaying the display data in accordance with the display code data.

In order to achieve the above object, a method according to the present invention includes changing a first code of display code data corresponding to an designated attribute to a second designated code and changing another first code to the second code, and displaying the display data in accordance with the display code data.

As described above, according to the present invention, a code change control routine in an operating system (OS) can be started during execution of an application program by operating predetermined keys. Therefore, at an arbitrary timing during the execution of the application program, a code corresponding to an designated attribute can be changed, and a code corresponding to another attribute having the same code as that assigned to the designated attribute, i.e., all codes with corresponding attributes having the same value as the designated attribute, can be also changed. Thus, a displayed gradation level can be changed. In this manner, an application program for a color display device can be executed in a computer having a monochromatic display without any difficulty.

BRIEF DESCRIPTION OF THE DRAWINGS

FIG. 2 is a flow chart describing an operation of the embodiment;

FIGS. 5A to 5C are views for describing a change of contents in conversion table 26 shown in FIG. 1.

DETAILED DESCRIPTION OF THE PREFERRED EMBODIMENT

A code conversion apparatus according to the present invention will be described in detail below with reference to the accompanying drawings.

Figure 1:
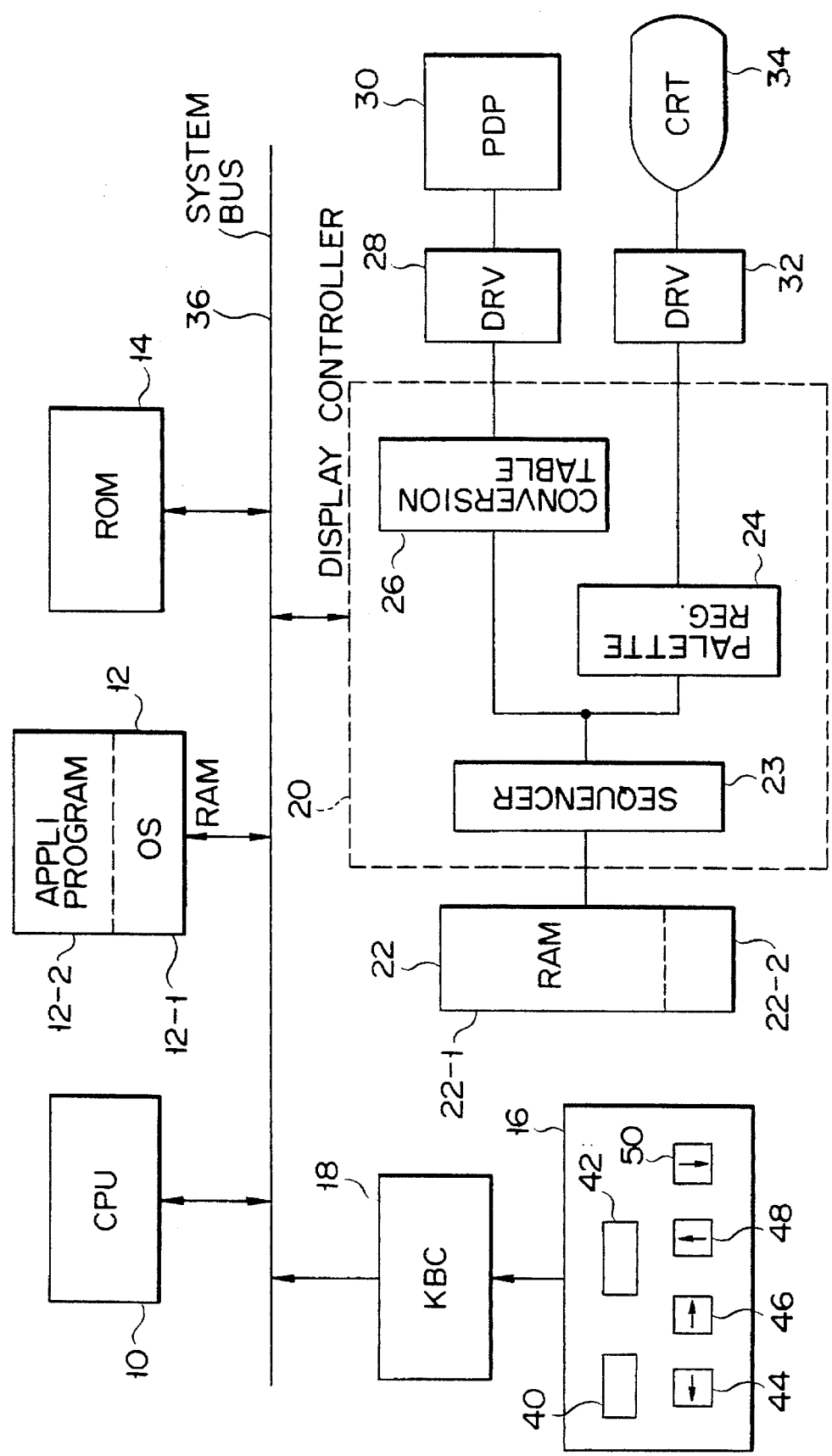
FIG. 1 is a block diagram showing an embodiment of the present invention capable of changing a code corresponding to an attribute.

Referring to FIG. 1, an arrangement of the apparatus according to an embodiment of the present invention will be described.

Figure 3:
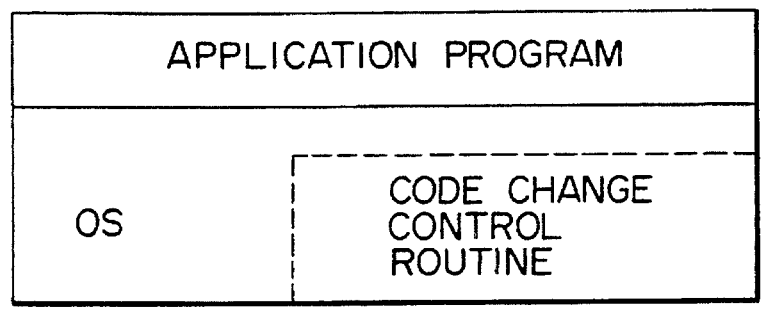
FIG. 3 is a memory map of RAM 12 shown in FIG. 1.

In FIG. 1, microprocessor (CPU) 10, RAM 12 and ROM 14 are connected to system bus 36. CPU 10 controls an operation of the overall apparatus in accordance with programs stored in RAM 12 and ROM 14. As shown in FIG. 3, RAM 12 stores an operating system (OS) and an application program to be executed. A code change control routine is included in the OS. ROM 14 stores a BIOS for controlling data input/output from/to devices connected to bus 36.

Keyboard 16 is connected to bus 36 through keyboard controller (KBC) 18. Keyboard 16 includes character keys (not shown), code change start key 40, code change end key 42, and left, right, up and down cursor keys 44, 46, 48 and 50. In a display mode in which the application program is executed, cursor keys 44, 46, 48 and 50 are normally operated. When code change start key 40 is pressed, a code change start instruction is generated and supplied to CPU 10 through KBC 18, thereby setting a code change mode. In the code change mode, keys 48 and 50 are used to select an attribute of display data to be changed. Keys 44 and 46 are used to change a code. When code change end key 42 is pressed, the code change mode is ended, and the display mode is restored.

Display controller 20 is connected to bus 36 and has sequencer 23, palette register 24 and conversion table 26. Controller 20 stores display data supplied through bus 36 in memory 22. Memory 22 has area 22-1 for storing the display data and buffer area 22-2 for temporarily storing display data. In a graphic display mode, the display data is stored with an attribute in memory 22 in units of pixels. The identical attribute is assigned to the pixels in a data portion of the display data. In a text display mode, each character is stored with an ASCII code and an attribute. An attribute representing a background representation is also stored.

Palette register 24 has, for example, 16 palettes, each of which holds a color code representing one of 64 colors. As described above, display data has an attribute representing a palette to be designated from the 16 palettes of register 24. In order to display data, the display data is read out from memory 22 by sequencer 23 and supplied to register 24 and conversion table 26. In accordance with attributes of the supplied display data, register 24 generates and supplies color codes to driver DRY 32. In accordance with the input color code, driver 32 displays the data on color CRT 34. In this embodiment, however, note that CRT 34 need not be connected.

Table 26 receives as an entry the same attribute of the display data as that supplied to register 24. Table 26 then converts the attribute of the display data to a gradation code, which is output to driver DRV 28. In accordance with the input gradation code, driver 28 displays the data on plasma display panel (PDP) 30.

Operations of the embodiment of the present invention will be described in detail below with reference to FIG. 2.

Assume that color codes are written in register 24 and gradation codes are written in table 26, as shown in FIG. 5A. Also, assume that an application program stored in area 12-2 of RAM 12 is currently executed and display data is stored in area 22-1 of RAM 22. This application program is developed for a color display device.

When the gradation of data displayed on PDP 30 is not satisfactory, an operator depresses code change start key 40 on keyboard 16 to generate a code change start instruction. The generated instruction is supplied to CPU 10 through KBC 18. If CPU 10 determines in step S2 that the code change start instruction is received, CPU 10 interrupts execution of the application program and sets a code change mode. The data of internal registers are stacked as in a normal interruption operation and then CPU 10 starts the code change control routine in the OS stored in area 12-1 of RAM 12.

Figure 4:
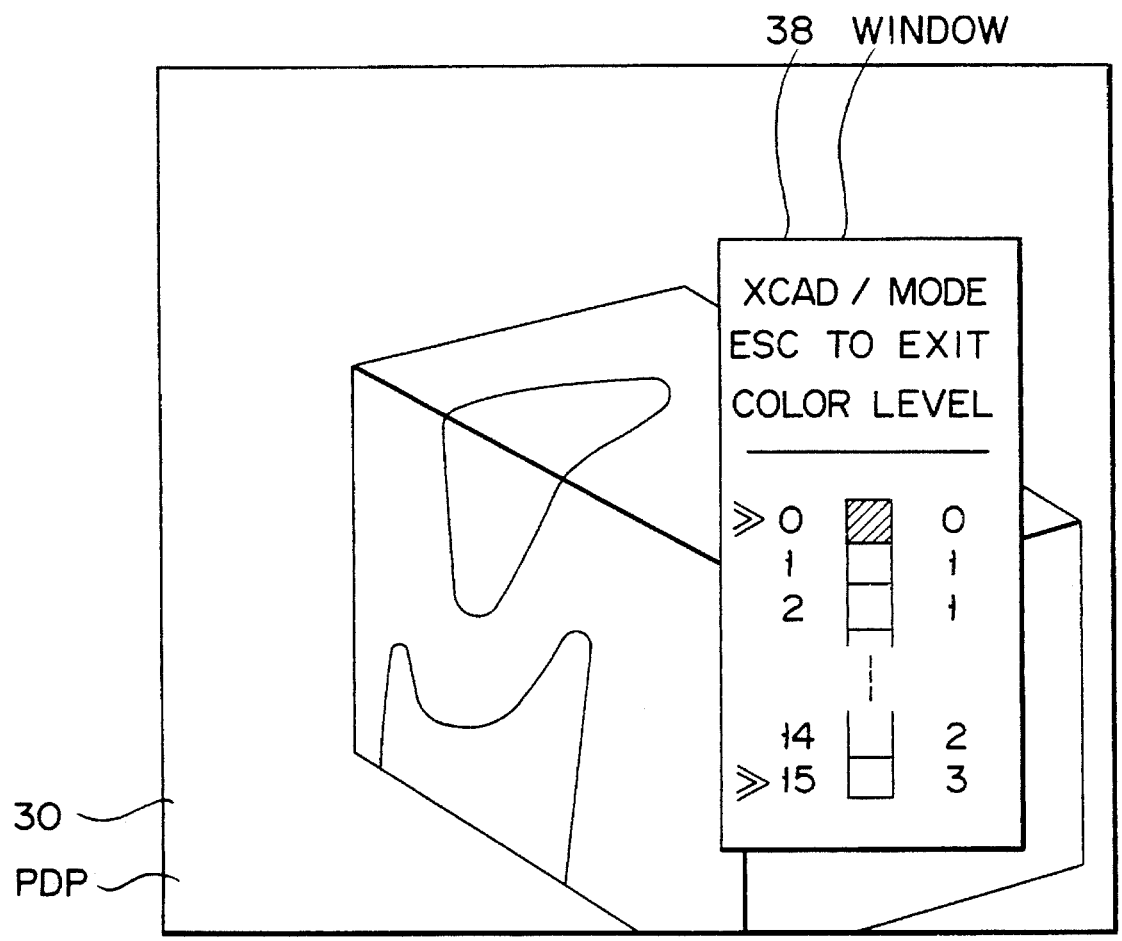
FIG. 4 is a schematic view describing an operation of the embodiment.

Upon start of the code change control routine, display data for an area in which a window is to be displayed, as shown in FIG. 4, is saved in area 22-2 of RAM 22 in step S4. When saving of the display data is completed, the display data for a window is written in RAM 22 through controller 20 in step S6 and the data including window 38 is displayed on PDP 30, as shown in FIG. 4. Each numeral at the left-hand side of window 38 represents an attribute of the display data stored in RAM 22 and corresponds to an entry in table 26; each numeral at the right-hand side of window 38 represents a gradation code. The mark ">>" in window 38 represents attributes currently used in display, and the hatched portion in the central region of window 38 represents an attribute currently selected.

When window 38 is displayed, CPU 10 waits for an input from keyboard 16 in step S8. When an instruction is keyed in at keyboard 16, the input instruction is checked in steps S10, S14 and S18. If the input instruction is other than an end, select or change instruction, the flow returns to step S8 and CPU waits for the next input.

When down cursor key 50 is depressed, a downward select instruction is generated and supplied to CPU 10 through KBC 18. If CPU 10 determines in step S14 that the input is the downward select instruction, step S16 is executed. As a result, the hatched portion at the central region in window 38 is moved downward. If the selected entry is already the lowermost entry, down cursor key 50 cannot function. If up cursor key 48 is depressed, an upward select instruction is generated, and the hatched portion at the central region in window 38 is moved upward, If the selected entry is already the uppermost entry, key 48 cannot function. In this manner, the attribute is selected as the entry to be changed. Thereafter, the flow returns to step S8. In FIG. 5A, in order to change display gradation codes of entries "12," "13" and "14" from "2" to "3", entry "12" is selected by depressing key 50 12 times.

Thereafter, when right cursor key 46 is depressed, an increment instruction is generated. If CPU 10 determines in step S18 that the input is the increment instruction, the display code for entry "12" is changed in step S20 from "2" to "3" as shown in FIG. 5B. In this manner, the gradation code is incremented by one unit each time key 46 is depressed. On the contrary, whenever left cursor key 44 is depressed, the gradation code is decremented by one at a time. Thus, data can be displayed on PDP 30 in a desired level of four gradation levels. Similar to keys 48 and 50, left or right cursor key 44 or 46 cannot function when the gradation code is 0 or 3.

In step S22, an attribute having the same display gradation code as that before change or "2" is searched. The display gradation code corresponding to the searched attribute is changed to the same code as that changed in step S20. Thereafter, the flow returns to step S8. The result is shown in FIG. 5C.

When code change end key 42 is depressed, a code change end instruction is generated and supplied to CPU 10. If CPU 10 determines in step S10 that the input is the end instruction, it executes step S12. In step S12, the data of the internal register of CPU 10 are recovered from the stack and the display data 22-2 is recovered corresponding locations of area 22-1. Then, the display mode is set and the application program is re-executed from the interrupted step. At this time, since the contents in conversion table 26 have been changed, the data stored in memory 22 is displayed on PDP 30 in accordance with the changed contents.

As has been described above, according to the present invention, a color display application program can be directly run without changes by a computer having a mono-color display device such as a PDP. In addition, since a gradation level can be freely selected, no color competition occurs and therefore discrimination between color boundaries is not interfered.

The present invention can be apparently applied not only to a change from a color code to a mono-color code but also to that between color codes.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A display apparatus comprising:

storage means for storing display data along with associated color codes indicative of colors in which the display data is to be displayed;

display means for displaying mono-color image data;

associating means for associating entries representing the color codes of the display data with gradation codes;

selecting means for selecting a gradation code associated with a first entry, the selected gradation code having a first value to be changed;

changing means for changing the first value of the selected gradation code into a second value different from said first value;

means for automatically finding all gradation codes having said first value other than said selected gradation code;

means for changing the value of each gradation code found by said means for finding to said second value;

the display means displaying the mono-color image data in accordance with the changed gradation codes.

2. An apparatus according to claim 1, wherein the selecting means includes:

first generating means for generating selection instruction;

second generating means for generating an input code change instruction;

third generating means for generating a start instruction; and fourth generating means for generating an end instruction.

3. An apparatus according to claim 2, wherein the changing means includes:

storage means for storing an application program and a code change program; and processor means for executing the application program in an execution mode, for resetting the apparatus from the execution mode to a code change mode in response to the start instruction to execute the code change program, and for resetting the apparatus from the code change mode to the execution mode in response to the end instruction, thereby stopping execution of the code change program and starting execution of the application program.

4. An apparatus according to claim 3, wherein said processor means executes the code change program by interrupting the application program in response to the start instruction, and resumes the application program in response to the end instruction.

5. An apparatus according to claim 3, wherein the code change program is included in an operating system.

6. A method for changing gradation codes corresponding to color codes of display data into a desired gradation code, the method comprising the steps of:

storing display data along with associated color codes indicative of colors in which the display data is to be displayed;

displaying mono-color image data;

associating entries representing the color codes of the display data with gradation codes;

selecting a gradation code associated with a first entry, said selected gradation code having a first value to be changed;

changing the first value of the selected gradation code into a second value different from said first value;

automatically finding all gradation codes having said first value, other than said selected gradation code;

changing the value of each gradation code found by said step of finding to said second value; and displaying the mono-color image data in accordance with the changed gradation codes.

7. A method according to claim 6, wherein changing of the gradation code is executed by a code change program for controlling change operation in response to a change start instruction.

8. A method according to claim 7, wherein the code change program is performed by interrupting an application program being currently executed in response to the change start instruction and the application program is resumed in response to a change end instruction.

9. A method according to claim 7, wherein the code change program is included in an operating system.

10. A method according to claim 7, wherein the color codes and the gradation codes corresponding to the color codes are displayed during changing of gradation codes.

\* \* \* \* \*